(12) United States Patent
Lyness et al.

(10) Patent No.: US 8,763,313 B2
(45) Date of Patent: Jul. 1, 2014

(54) METHODS AND SYSTEMS FOR ASSEMBLING A TOWER

(75) Inventors: Thomas Edward Lyness, Greer, SC (US); Senthil Kumar, Tamilnadu (IN)

(73) Assignee: General Electric Company, Schenectady, NY (US)

( * ) Notice: Subject to any disclaimer, the term of this patent is extended or adjusted under 35 U.S.C. 154(b) by 775 days.

(21) Appl. No.: 11/940,977

(22) Filed: Nov. 15, 2007

(65) Prior Publication Data

US 2009/0126309 A1 May 21, 2009

(51) Int. Cl.
*E04H 12/00* (2006.01)

(52) U.S. Cl.
USPC .................................. 52/40; 52/192

(58) Field of Classification Search
USPC .................... 52/40, 123.1, 192, 843
See application file for complete search history.

(56) References Cited

U.S. PATENT DOCUMENTS

| | | | |
|---|---|---|---|
| 1,947,515 A * | 2/1934 | Blackburn | 220/567 |
| 3,222,040 A * | 12/1965 | Eckert | 261/94 |
| 3,768,016 A * | 10/1973 | Townsend et al. | 455/25 |
| 4,133,852 A * | 1/1979 | DiNicolantonio et al. | 261/114.5 |
| 4,231,200 A | 11/1980 | Henderson | |
| 5,333,436 A | 8/1994 | Noble | |
| 6,113,079 A * | 9/2000 | Urbanski et al. | 261/114.5 |
| 6,467,233 B1 | 10/2002 | Maliszewski et al. | |
| 6,470,645 B1 | 10/2002 | Maliszewski et al. | |
| 6,532,700 B1 * | 3/2003 | Maliszewski et al. | 52/40 |
| 6,979,170 B2 | 12/2005 | Dery et al. | |
| 7,276,808 B2 | 10/2007 | Weitkamp et al. | |
| 7,387,497 B2 * | 6/2008 | Cone | 416/244 R |
| 7,436,084 B2 * | 10/2008 | Wobben | 290/55 |
| 2002/0184838 A1 * | 12/2002 | Johnson et al. | 52/192 |
| 2003/0147753 A1 * | 8/2003 | Ollgaard | 416/244 A |
| 2007/0095008 A1 | 5/2007 | Arsene | |
| 2007/0125037 A1 | 6/2007 | Meiners | |
| 2007/0294955 A1 | 12/2007 | Sportel | |

* cited by examiner

*Primary Examiner* — Branon Painter
(74) *Attorney, Agent, or Firm* — James McGinness, Esq.; Armstrong Teasdale LLP

(57) ABSTRACT

A method for assembling a tower is provided. The method comprises providing a plurality of tower segments, wherein at least one tower segment includes an inner surface that defines a first cross-sectional area of the tower segment and a second cross-sectional area of the tower segment that is different from the first cross-sectional area. The method also comprises providing a platform including a plurality of mounting assemblies configured to mount the platform within the at least one tower segment at one of the first cross-sectional area and the second cross-sectional area, coupling the platform to the inner surface of the tower segment at one of the first cross-sectional area and the second cross-sectional area, and coupling the plurality of tower segments.

17 Claims, 6 Drawing Sheets

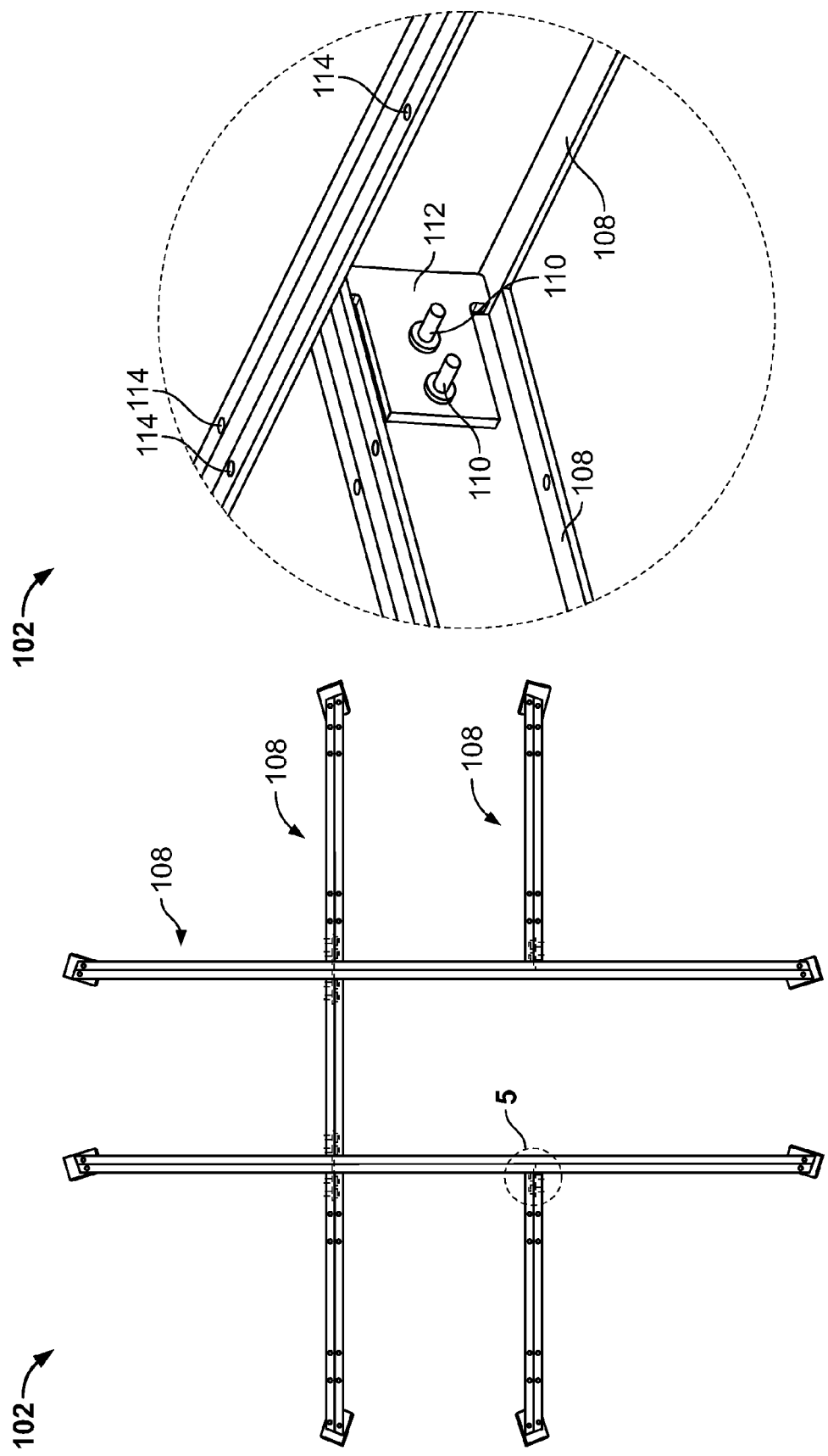

METHODS AND SYSTEMS FOR ASSEMBLING A TOWER

BACKGROUND OF THE INVENTION

This invention relates generally to wind turbine towers, and more particularly, to methods and systems for assembling a wind turbine tower.

Because of the height of known wind turbine towers, it may be difficult to transport a pre-assembled tower to the erection site. As a result, at least some known wind turbine towers are assembled from a number of tower portions at the erection site. With known wind turbine towers, at least some of the tower portions have different cross-sectional shapes and/or different wall thicknesses to accommodate the weight of the turbine atop the tower.

When assembling a wind turbine tower, platforms are often needed within the tower structure to provide a surface upon which the tower assemblers may stand when assembling adjoining tower portions together. However, because of the varying cross-sectional shapes and wall thicknesses of the tower portions, a uniquely manufactured platform is often used at each tower section having a different cross-sectional shape and/or wall thickness.

BRIEF DESCRIPTION OF THE INVENTION

In one aspect, a method for assembling a tower is provided. The method comprises providing a plurality of tower segments, wherein at least one tower segment includes an inner surface that defines a first cross-sectional area of the tower segment and a second cross-sectional area of the tower segment that is different from the first cross-sectional area. The method also comprises providing a platform including a plurality of mounting assemblies configured to mount the platform within the at least one tower segment at one of the first cross-sectional area and the second cross-sectional area, coupling the platform to the inner surface of the tower segment at one of the first cross-sectional area and the second cross-sectional area, and coupling the plurality of tower segments.

In another aspect, a tower is provided. The tower includes a first end, a second end, and a shell extending between the first and second ends, wherein the shell includes at least one tower segment including an inner surface that defines a first cross-sectional area of the tower segment and a second cross-sectional area of the tower segment that is different from the first cross-sectional area. The tower also includes a platform including a plurality of mounting assemblies configured to mount the platform within the at least one tower segment at one of the first cross-sectional area and the second cross-sectional area.

In a further aspect, a platform for a tower is provided, wherein the tower includes an inner surface that defines a cavity therethrough wherein the cavity has a first cross-sectional area and a second cross-sectional area that is different from the first cross-sectional area. The platform includes a support frame and a floor coupled to the support frame. The platform also includes a plurality of mounting assemblies coupled to the support frame and the floor, the mounting assemblies configured to mount the platform within the tower at one of the first cross-sectional area and the second cross-sectional area of the cavity.

BRIEF DESCRIPTION OF THE DRAWINGS

FIG. 4 is a plan view of an exemplary support frame that may be used within the platform shown in FIG. 3;

FIG. 5 is a perspective view of a portion of the support frame shown in FIG. 4 and taken along area 5;

DETAILED DESCRIPTION OF THE INVENTION

Figure 1:
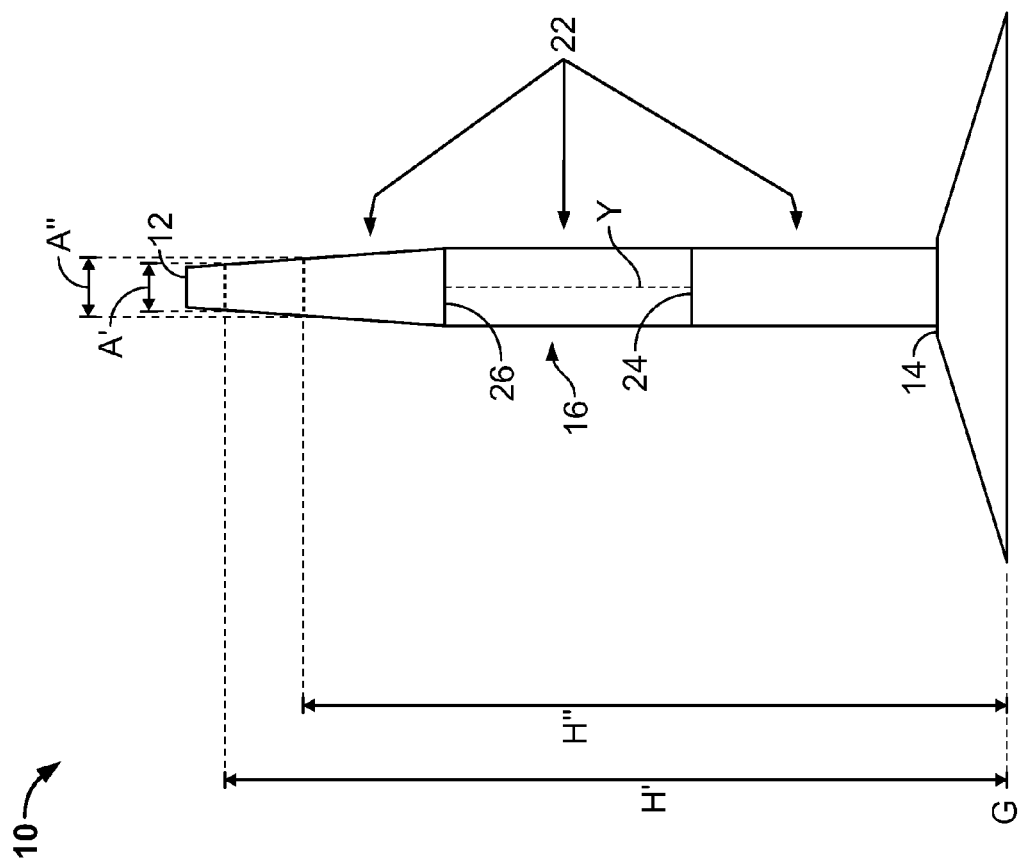
FIG. 1 is a side view of an exemplary wind turbine tower.

FIG. 1 is a side view of an exemplary wind turbine tower 10. While tower 10 may be designed for use in various mechanical arrangements, in the exemplary embodiment, tower 10 is used to support a wind turbine (not shown). Specifically, in the exemplary embodiment, tower 10 has a top 12, a bottom 14, and includes a generally cylindrical shell 16 that extends therebetween. While the exemplary tower 10 is described herein as being generally cylindrical, alternative embodiments of shell 16 may have any cross-sectional shape that enables tower 10 to function as described herein. Tower 10 includes a plurality of tower segments 22, and shell 16 is formed by coupling adjacent tower segments 22 together.

Figure 2:
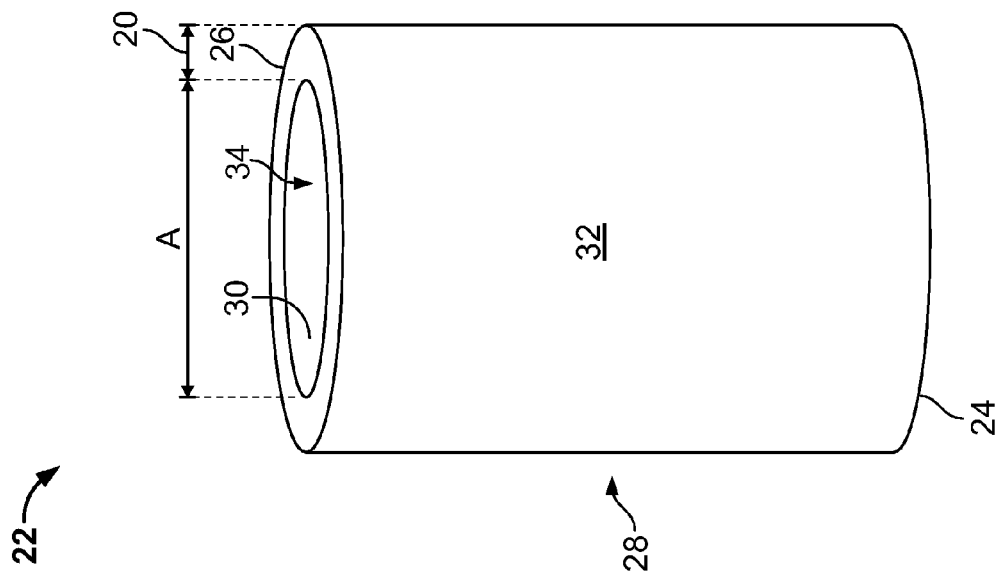
FIG. 2 is a perspective view of an exemplary tower segment that may be used within the wind turbine tower shown in FIG. 1.

FIG. 2 is a perspective view of an exemplary tower segment 22 that may be used within tower 10. Each tower segment 22 includes a first end 24, a second end 26, and a body 28 extending therebetween. In the exemplary embodiment, tower 10 includes three tower segments 22. Alternatively, tower 10 may include any number of tower segments 22 that enables tower 10 to function as described herein. Each tower segment 22 has an inner surface 30 and an opposite outer surface 32 defining a thickness 20 therebetween. In the exemplary embodiment, inner surface 30 defines a cavity 34 that extends from first end 24 to second end 26. Accordingly, cavity 34 has a cross-sectional area A defined by inner surface 30, and tower segment 22 has a cross-sectional profile (now shown in FIG. 2) defined by outer surface 32. It should be noted that the tower cross-sectional profile (not shown in FIG. 2) may or may not be the same shape as the cross-sectional area A of cavity 34. As shown in FIG. 1, in the exemplary embodiment, each tower segment 22 includes a centerline axis Y that extends from first end 24 to second end 26.

In an exemplary embodiment, the thickness 20 of each tower segment 22, and that of shell 16, is substantially uniform from tower bottom 14 to tower top 12. In an alternative embodiment, the thickness 20 of each tower segment 22, and that of shell 16, may decrease from tower bottom 14 towards tower top 12. In the exemplary embodiment, as shown in FIG. 1, tower 10 includes at least one tower segment 22 that tapers from first end 24 to second end 26, such that tower segment 22 includes a first cross-sectional area A' at a height H' above a grade G and a second cross-sectional area A" at a height H" above grade G, wherein the first cross-sectional area A' is different from the second cross-sectional area A". In an alternative embodiment, tower 10 includes at least one tower segment 22 that has a thickness 20 that varies from first end 24 to second end 26, such that tower segment 22 includes a first cross-sectional area A' at a height H' above grade G and a second cross-sectional area A" at a height H" above grade G, wherein the first cross-sectional area A' is different from the second cross-sectional area A".

In the exemplary embodiment at least one platform (not shown in FIG. 1 or 2) is mounted within at least one tower segment cavity 34. More specifically, each platform (not shown in FIG. 1 or 2) is coupled to shell inner surface 30 as described in more detail below.

Figure 3:
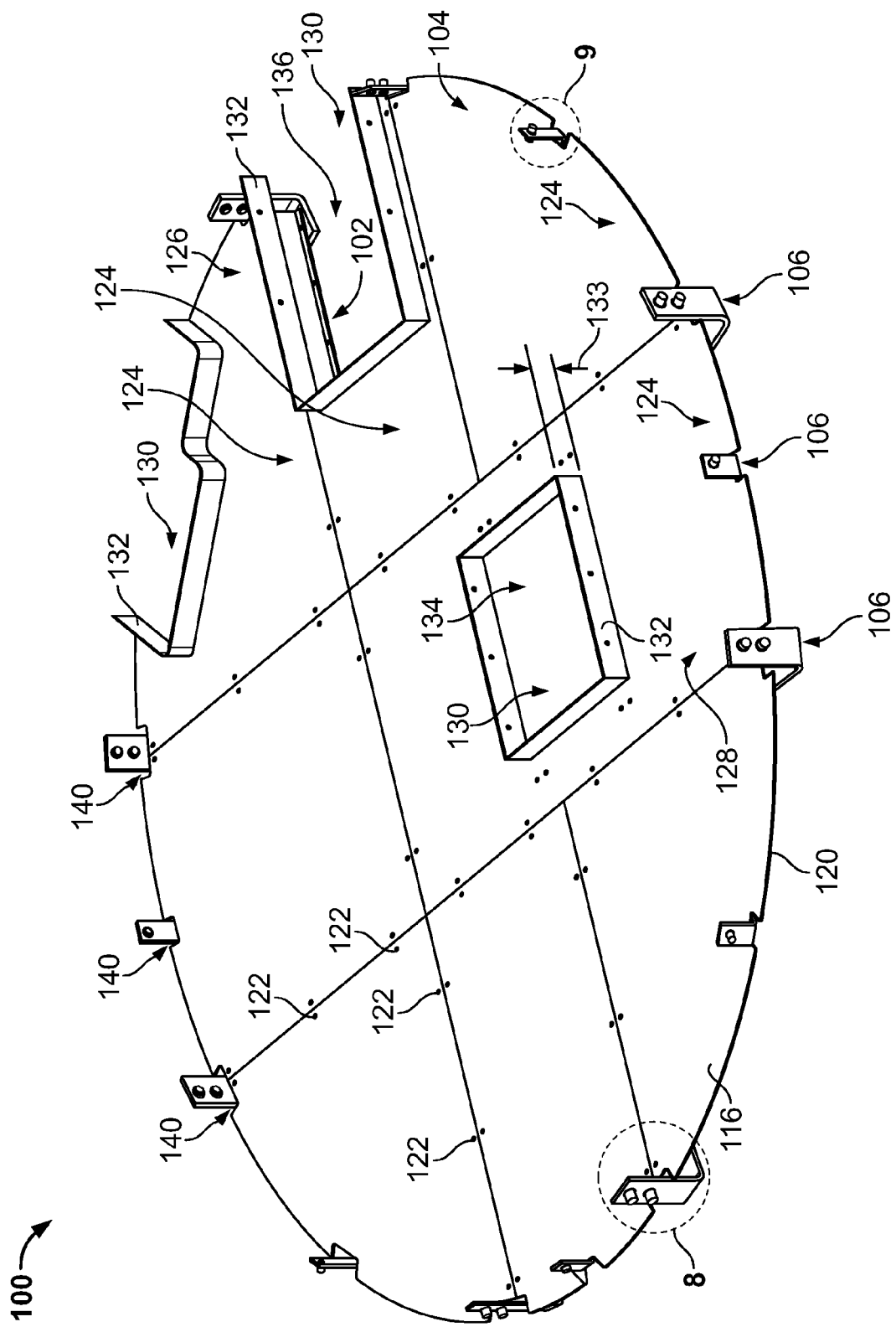
FIG. 3 is a perspective view of an exemplary platform that may be used within the wind turbine tower shown in FIG. 1.

FIG. 3 is a perspective view of an exemplary platform 100 that may be used within wind turbine tower 10. Platform 100, as described in more detail below, includes a support frame 102, a floor 104, and a plurality of mounting assemblies 106.

FIG. 4 is a plan view of an exemplary support flame 102 that may be used within the platform 100. In the exemplary embodiment, support frame 102 includes a plurality of support beams 108 coupled together in a grid-like formation. Alternatively, support beams 108 may be arranged in parallel, such that support beams 108 do not intersect.

FIG. 5 is a perspective view of a portion of the support frame 102 shown in FIG. 4 and taken along area 5. In the exemplary embodiment, support beams 108 are I-Beams that are coupled together substantially perpendicularly using a plurality of support beam fasteners 110 and at least one reinforcing plate 112. Alternatively, support frame 102 may include any number of support beams 108, formed in any size or shape, that are coupled together in any orientation that enables support frame 102 to function as described herein. In the exemplary embodiment, support frame 102 also includes a plurality of support frame fastener openings 114 that enable a component, such as a floor (not shown in FIG. 4) to be coupled to support frame 102 and/or enable support frame 102 to be coupled to shell 16.

As shown in FIG. 3, in the exemplary embodiment, platform 100 includes a floor 104. In the exemplary embodiment, floor 104 includes a top surface 116, a bottom surface (not shown in FIG. 3), a perimeter 120, and a plurality of floor fastener openings 122 extending therethrough. The exemplary floor 104 is fastened to support frame 102 such that bottom surface (not shown in FIG. 3) engages support frame 102 in a mating arrangement, wherein at least one floor fastener (not shown in FIG. 3) extends through at least one floor fastener opening 122 and through at least one support frame fastener opening 114 to fasten floor 104 to support frame 102. Alternatively, floor 104 may be coupled to support frame 102 using any suitable means. In the exemplary embodiment, floor 104 is sized to substantially conform to a cross-sectional area A of cavity 34, wherein a substantial portion of perimeter 120 is substantially adjacent inner surface 30. While floor 104 has a generally circular shape in the exemplary embodiment, alternative embodiments of floor 104 may have any suitable shape that allows floor 104 to function as described herein.

In the exemplary embodiment, floor 104 includes a plurality of floor segments 124 including a plurality of generally triangularly shaped floor segments 126 and a plurality of generally rectangularly shaped floor segments 128. Alternatively, floor 104 may include a plurality of floor segments 124 having any shape that allows floor 104 to function as described herein.

In the exemplary embodiment, floor 104 includes a plurality of access openings 130 extending therethrough and a plurality of kick panels 132 coupled thereto, wherein each kick panel 132 at least partially circumscribes access opening 130 and extends a height 133 above floor top surface 116. In the exemplary embodiment, the plurality of access openings 130 includes a first generally rectangularly shaped access opening 134 that permits a load to be hoisted through platform 100 and a second generally rectangularly shaped access opening 136 that permits human ascent through platform 100 using a ladder (not shown in FIG. 3) coupled to inner surface 30. In an alternative embodiment, at least one door (not shown in FIG. 3) is hingedly coupled to at least one kick panel 132 in order to cover at least a portion of at least one access opening 130. The exemplary floor 104 also includes a plurality of notches 140 spaced around perimeter 120 and extending inwardly therefrom.

Figure 6:
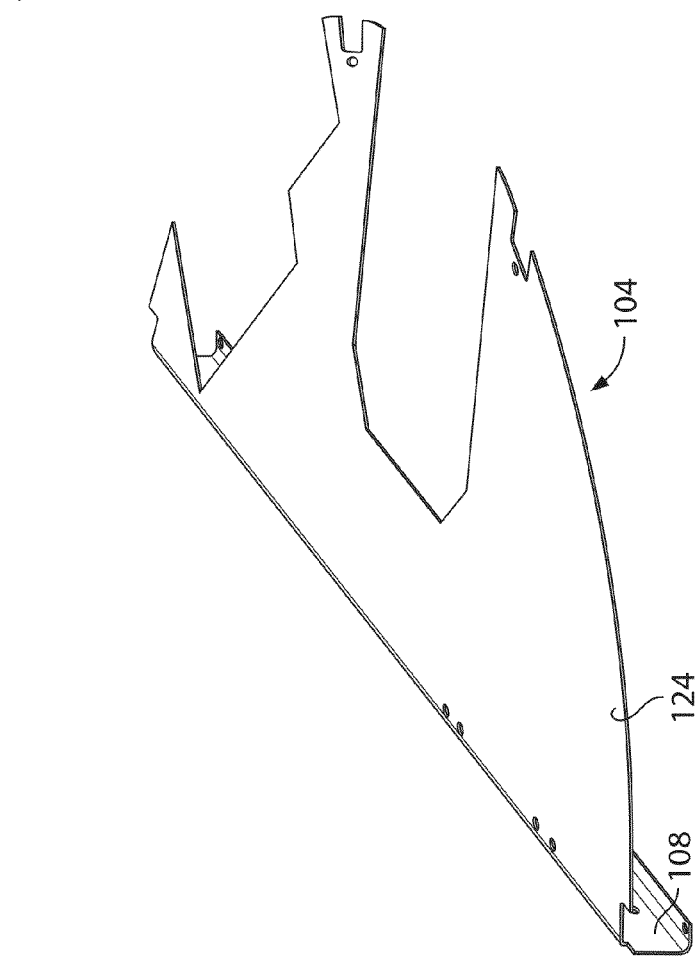
FIG. 6 is a perspective view of a portion of an alternative embodiment of the platform shown in FIG. 3.

FIG. 6 is a perspective view of a portion of an alternative embodiment of platform 100. As shown in FIG. 6, in an alternative embodiment, floor 104 includes at least one floor segment 124 and at least one support beam 108 that are integrally formed.

Figure 7:
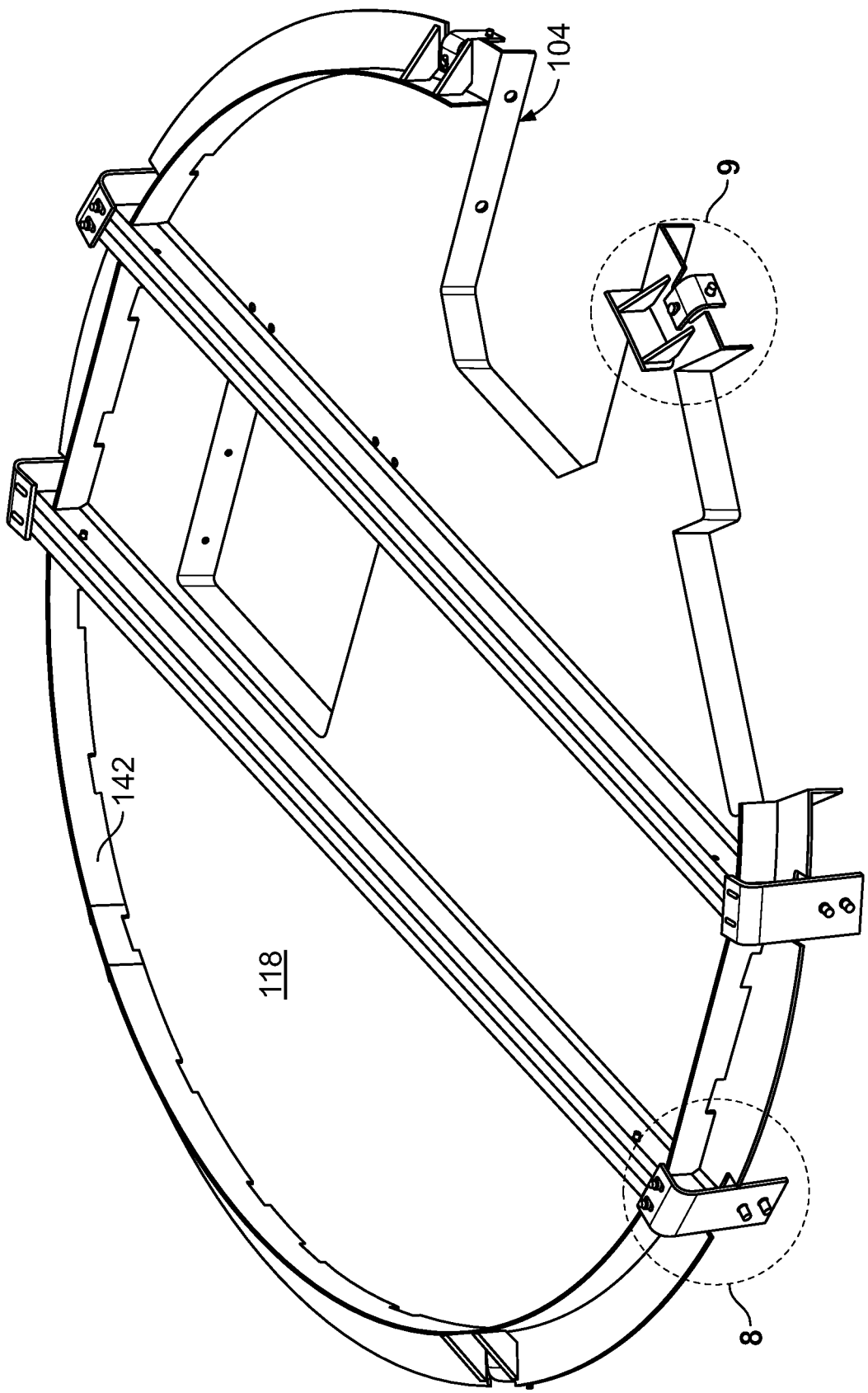
FIG. 7 is a perspective bottom view of an alternative embodiment of the platform shown in FIG. 3.

FIG. 7 is a perspective bottom view of an alternative embodiment of platform 100. As shown in FIG. 7, an alternative embodiment of floor 104 includes a generally annular floor frame 142 coupled to and extending substantially perpendicularly from bottom surface 118.

Figure 8:
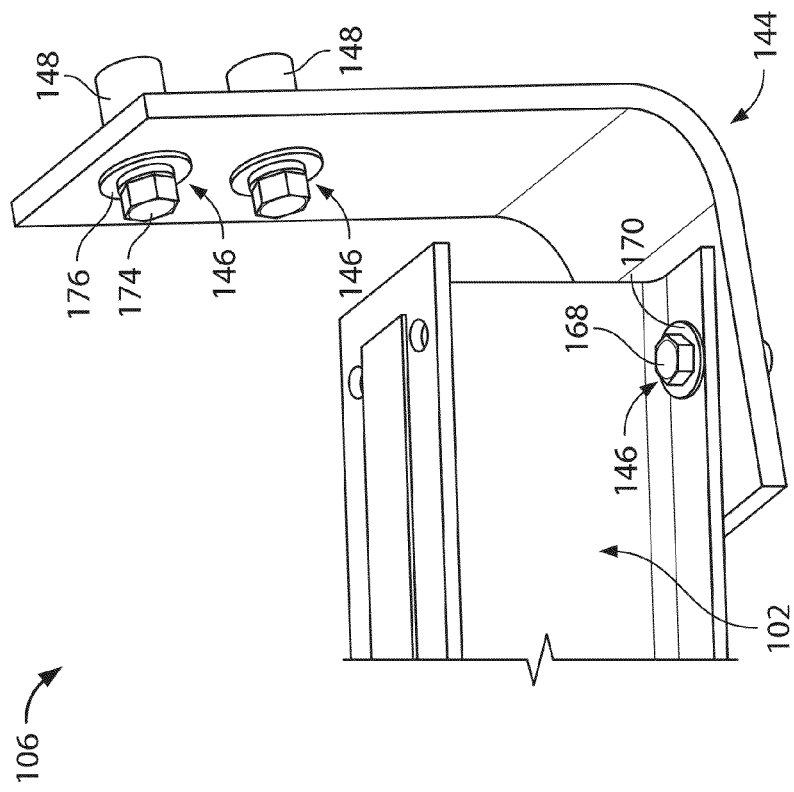
FIG. 8 is an enlarged perspective view of an exemplary mounting assembly used within the platform shown in FIGS. 3 and 7 taken along area 8.
Figure 9:
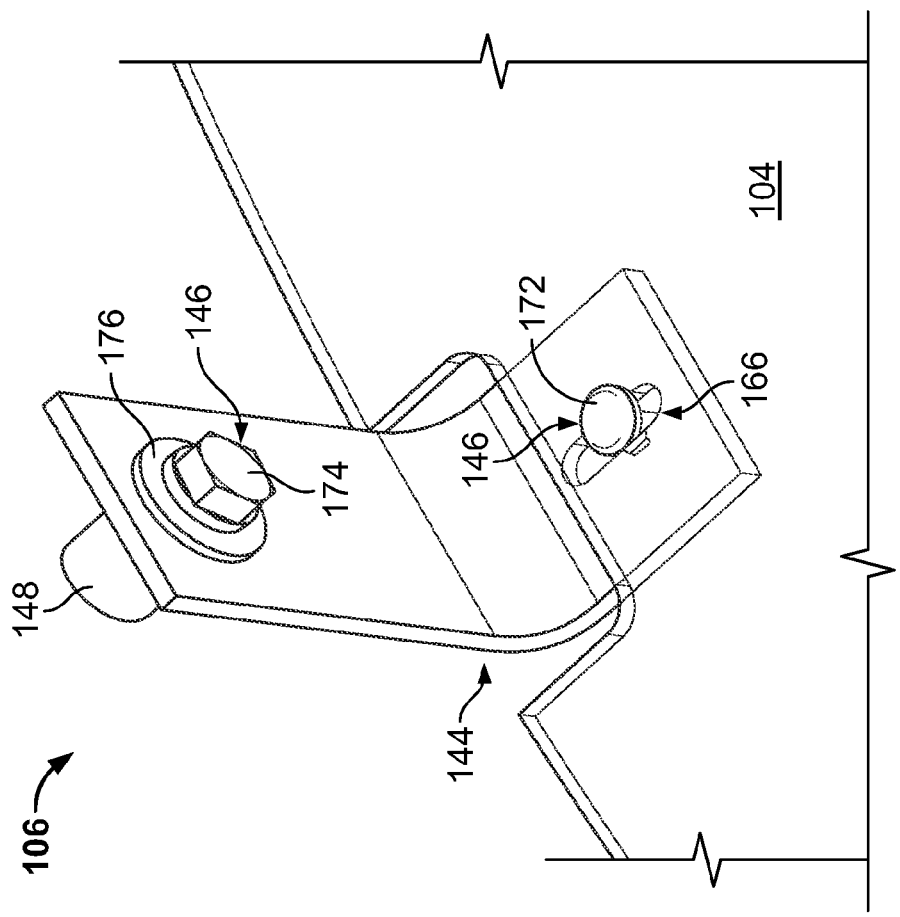
FIG. 9 is an enlarged perspective view of another exemplary mounting assembly used within the platform shown in FIGS. 3 and 7 taken along area 9.

FIGS. 8 and 9 are enlarged perspective views of a plurality of exemplary mounting assemblies 106 used within the platform 100. In the exemplary embodiment, mounting assembly 106 includes a bracket 144, a plurality of bracket fasteners 146, and at least one boss 148. In an alternative embodiment, bracket 144 may be formed and/or utilized without boss 148.

Figure 10:
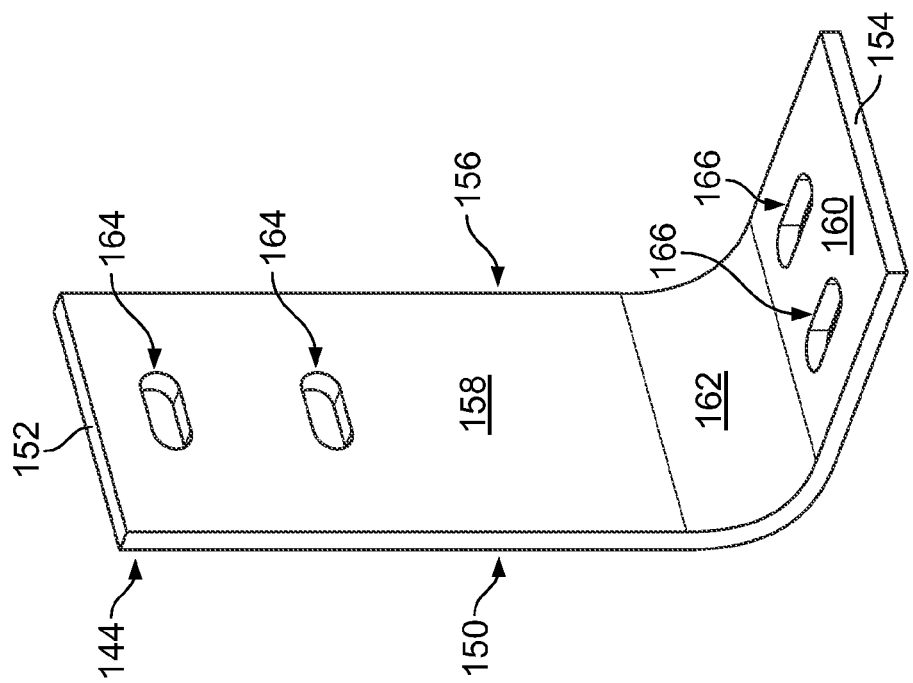
FIG. 10 is an enlarged perspective view of an exemplary bracket used within the mounting assembly shown in FIG. 8.

FIG. 10 is a perspective view of an exemplary bracket 144 to be used in mounting assembly 106. In the exemplary embodiment, bracket 144 is formed from a generally rectangularly shaped strip 150 of metal having a first edge 152, a second edge 154, and a strip body 156 extending therebetween, wherein strip body 156 includes a shell mounting portion 158 extending from first edge 152, a platform mounting portion 160 extending from second edge 154, and an intermediate portion 162 extending between shell mounting portion 158 and platform mounting portion 160. In the exemplary embodiment, strip 150 is bent about intermediate portion 162 such that shell mounting portion 158 and platform mounting portion 160 are substantially orthogonally aligned. While strip 150 is described herein as being made of metal, strip 150 may be made from any material that allows bracket 144 to function as described herein.

In the exemplary embodiment, shell mounting portion 158 includes at least one elongated shell mounting slot 164 therethrough, wherein the at least one shell mounting slot 164 extends substantially parallel to first edge 152, and platform mounting portion 160 includes at least one elongated platform mounting slot 166 extending therethrough, wherein the at least one platform mounting slot 166 extends substantially perpendicularly to second edge 154. More specifically, FIG. 8 illustrates an exemplary bracket 144 for coupling support frame 102 to shell 16, wherein bracket 144 includes two substantially parallel platform mounting slots (not shown in FIG. 8) and two substantially parallel shell mounting slots (not shown in FIG. 8). Additionally, FIG. 9 illustrates an exemplary bracket 144 for coupling floor 104 to shell 16, wherein bracket 144 includes a single platform mounting slot 166 and a single shell mounting slot (not shown in FIG. 9). In alternative embodiments, slots 164 and 166 may be any shape and may be oriented in any direction that allows bracket 144 to function as described herein.

As shown in FIG. 3, in the exemplary embodiment, a plurality of mounting assemblies 106 are coupled to support frame 102, wherein each mounting assembly 106 is configured to assist in mounting platform 100 within cavity 34 at one of the first cross-sectional area A' and the second cross-sectional area A". More specifically, as shown in FIG. 8, bracket 144 is coupled to support frame 102 using at least one bracket fastener 146 that extends through support frame fastener opening 114 and through platform mounting slot 166 in order to couple bracket 144 to support frame 102. As such, bracket 144 is inwardly and outwardly slideable within notch 140 along platform mounting slot 166 when bracket fastener 146 extends through platform mounting slot 166 in order facilitate coupling platform 100 to inner surface 30 within cavity 34 at one of cross-sectional area A' and cross-sectional area A", and bracket 144 is at least partially rotatable about bracket fastener 146 when bracket fastener 146 extends through platform mounting slot 166 in order facilitate coupling platform 100 to inner surface 30 within cavity 34 at one of cross-sectional area A' and cross-sectional area A". In the exemplary embodiment, at least one bracket fastener 146 includes a washer 170 and a bolt 168. Alternatively, bracket fastener 146 may include any fastening means that allows mounting assembly 106 to function as described herein.

As shown in FIG. 3, in the exemplary embodiment, a plurality of mounting assemblies 106 are also coupled to floor 104, wherein each mounting assembly 106 is configured to assist in mounting platform 100 within cavity 34 at one of the first cross-sectional area A' and the second cross-sectional area A". As shown in FIG. 9, each bracket 144 is coupled to floor 104 using at least one bracket fastener 146 that extends through floor fastener opening 122 and through platform mounting slot 166 in order to couple bracket 144 to floor 104. As such, bracket 144 is inwardly and outwardly slideable within notch 140 along platform mounting slot 166 when bracket fastener 146 extends through platform mounting slot 166 in order facilitate coupling platform 100 to inner surface 30 within cavity 34 at one of cross-sectional area A' and cross-sectional area A", and bracket 144 is at least partially rotatable about bracket fastener 146 when bracket fastener 146 extends through platform mounting slot 166 in order facilitate coupling platform 100 to inner surface 30 within cavity 34 at one of cross-sectional area A' and cross-sectional area A". In the exemplary embodiment, at least one bracket fastener 146 includes a rivet 172. Alternatively, bracket fastener 146 may include any fastening means that allows mounting assembly 106 to function as described herein.

As shown in FIGS. 8 and 9, in the exemplary embodiment, each bracket 144 of platform 100 is coupled to shell 16 using at least one bracket fastener 146 and at least one boss 148, wherein bracket fastener 146 extends through shell mounting slot 164 and into boss 148. In the exemplary embodiment, at least one bracket fastener 146 includes a bolt 174 and a washer 176.

In each embodiment, the above-described platform includes a mounting assembly that facilitates configuring the platform to mount within a first cross-sectional area and a second cross-sectional area of a tower cavity. More specifically, in each embodiment, the mounting assemblies include a bracket including an elongated slot that enables the bracket to slideably engage the support frame and the floor of the platform. As a result, the adjustable mounting assemblies facilitate reducing the need for manufacturing unique platform structures to accommodate the various changes in shape and thickness of the tower shell. Accordingly, manufacturing costs will decrease because the need to manufacture various unique platform structures will be significantly reduced. Moreover, the invention provides a means wherein existing mounting assemblies can be modified to facilitate cost-effective tower manufacturing.

Exemplary embodiments of methods and systems for assembling a tower are described above in detail. These methods and systems for assembling a tower are not limited to the specific embodiments described herein, but rather, components of the methods and systems may be utilized independently and separately from other components described herein. For example, the platform described above may have other industrial or consumer applications and is not limited to practice with only wind turbine towers as described herein. Rather, the present invention can be implemented and utilized in connection with many other products and systems.

While the invention has been described in terms of various specific embodiments, those skilled in the art will recognize that the invention can be practiced with modification within the spirit and scope of the claims.

What is claimed is:

1. A method for assembling a tower, said method comprising:
    providing a plurality of tower segments, wherein at least one tower segment includes an inner surface that defines a first cross-sectional area of the tower segment and a second cross-sectional area of the tower segment that is different from the first cross-sectional area;
    providing a platform including a plurality of mounting assemblies that are selectively adjustable, a floor having a perimeter, and a support frame, wherein at least a part of said perimeter is arcuate and wherein the plurality of mounting assemblies that are selectively adjustable are configured to enable the platform to mount within the at least one tower segment at the first cross-sectional area and to enable the platform to mount within the at least one tower segment at the second cross-sectional area;
    coupling the platform to the inner surface of the tower segment at one of the first cross-sectional area and the second cross-sectional area said coupling comprising:
        coupling the plurality of mounting assemblies that are selectively adjustable to the inner surface;
        coupling the floor to at least a first mounting assembly of the plurality of mounting assemblies that are selectively adjustable to position at least the arcuate portion of the perimeter of the floor against the inner surface of the at least one tower segment; and
        coupling the support frame to at least a second mounting assembly of the plurality of mounting assemblies that are selectively adjustable; and
    coupling the plurality of tower segments.

2. A method in accordance with claim 1 wherein the support frame includes a plurality of support beams.

3. A method in accordance with claim 2 wherein at least one of the plurality of floor segments and at least one of the plurality of support beams are integrally formed.

4. A method in accordance with claim 1 wherein a plurality of notches are spaced along the perimeter and extending inwardly therefrom.

5. A method in accordance with claim 4 wherein at least one of the plurality of mounting assemblies are selectively adjustable to couple to the floor while positioned within at least one of the plurality of notches.

6. A method in accordance with claim 1 wherein at least one of the plurality of mounting assemblies comprises a bracket, the bracket includes at least one elongated slot extending therethrough, the support frame oriented to be slidably received within the slot.

7. A tower comprising:
    a first end;
    a second end;

a shell extending between said first and second ends, wherein said shell comprises at least one tower segment comprising an inner surface that defines a first cross-sectional area of said tower segment and a second cross-sectional area of said tower segment that is different from the first cross-sectional area; and a platform comprising:

a plurality of mounting assemblies that are selectively adjustable coupled to said inner surface, said mounting assemblies are selectively adjustable and configured to mount said platform within said at least one tower segment at the first cross-sectional area and configured to mount said platform within said at least one tower segment at the second cross-sectional area;

a floor comprising a plurality of floor segments positioned to form a perimeter of said floor, said floor coupled to at least a first mounting assembly of said plurality of mounting assemblies that are selectively adjustable to position a substantial portion of said perimeter substantially along said inner surface of said at least one tower segment; and a support frame coupled to said floor and to at least a second mounting assembly of said plurality of mounting assemblies that are selectively adjustable.

8. A tower in accordance with claim 7 wherein support frame comprises a plurality of support beams.

9. A tower in accordance with claim 8 wherein at least one of said plurality of floor segments and at least one of said plurality of support beams are integrally formed.

10. A tower in accordance with claim 7 wherein said floor comprises a plurality of notches spaced along said perimeter and extending inwardly therefrom.

11. A tower in accordance with claim 10 wherein at least one of said plurality of mounting assemblies are selectively adjustable to couple to the floor while positioned within at least one of the plurality of notches.

12. A tower in accordance with claim 7 wherein at least one of the plurality of mounting assemblies comprises a bracket comprising at least one elongated slot extending therethrough, said support frame oriented to be slidably received within said slot.

13. A platform for a tower, the tower including an inner surface that defines a cavity therethrough wherein the cavity has a first cross-sectional area and a second cross-sectional area that is different from the first cross-sectional area, said platform comprising:

a support frame;

a floor comprising a plurality of floor segments coupled to said support frame, said floor having a perimeter defined around said plurality of floor segments; and a plurality of mounting assemblies that are selectively adjustable coupled to the inner surface, said mounting assemblies are selectively adjustable and configured to mount said platform within the tower at the first cross-sectional area of the cavity and configured to mount said platform within the tower at the second cross-sectional area of the cavity, said plurality of mounting assemblies that are selectively adjustable comprising at least a first mounting assembly coupled to said support frame and at least a second mounting assembly coupled to said floor to position a substantial portion of said perimeter substantially along the inner surface.

14. A platform in accordance with claim 13 wherein said support frame comprises a plurality of support beams.

15. A platform in accordance with claim 13 wherein said floor comprises a plurality of notches spaced along said perimeter and extending inwardly therefrom.

16. A platform in accordance with claim 15 wherein at least one of said plurality of mounting assemblies are selectively adjustable to couple to said floor while positioned within at least one of said plurality of notches.

17. A platform in accordance with claim 16 wherein at least one of said plurality of mounting assemblies comprises a bracket comprising at least one elongated slot extending therethrough, said support frame configured to be slidably received within said slot.

\* \* \* \* \*